(12) United States Patent
Clark et al.

(10) Patent No.: US 7,536,830 B2
(45) Date of Patent: May 26, 2009

(54) INNER BELT ATTACHED TO DOOR INNER TRIM PANEL

(75) Inventors: Patrick Clark, South Lyon, MI (US); Greg Roush, Saline, MI (US); Mike Heinze, Canton, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 149 days.

(21) Appl. No.: 11/500,689

(22) Filed: Aug. 8, 2006

(65) Prior Publication Data

US 2008/0034664 A1 Feb. 14, 2008

(51) Int. Cl.
*B60J 1/17* (2006.01)
(52) U.S. Cl. .................. 49/377; 49/490.1; 296/146.7
(58) Field of Classification Search .............. 49/377, 49/475.1, 490.1, 483.1; 296/146.2, 146.1, 296/146.7, 146.9
See application file for complete search history.

(56) References Cited

U.S. PATENT DOCUMENTS

| | | | |
|---|---|---|---|
| 1,705,454 A * | 3/1929 | Griffiths | 49/475.1 |
| 2,266,801 A * | 12/1941 | Reid | 49/377 |
| 2,457,312 A * | 12/1948 | Kramer | 49/490.1 |
| 5,519,968 A * | 5/1996 | Dupuy | 49/489.1 |
| 5,775,030 A * | 7/1998 | Hamabata | 49/377 |
| 6,282,840 B1 * | 9/2001 | Vance | 49/377 |
| 7,171,785 B1 * | 2/2007 | Kelly et al. | 49/377 |
| 2004/0036234 A1 * | 2/2004 | Plottnik | 277/642 |
| 2004/0094989 A1 * | 5/2004 | Matsumoto et al. | 296/146.1 |

* cited by examiner

*Primary Examiner*—Gregory J. Strimbu
(74) *Attorney, Agent, or Firm*—Fay Sharpe LLP

(57) ABSTRACT

An inner belt is received on an associated vehicle flange. A U-shaped gripping portion of the inner belt is formed by first and second legs dimensioned for receipt on opposite faces of the flange. Rigid spaced hooks extend from a body of the inner belt and form upturned cavities that engage with similar hook portions formed on an associated inner trim panel. An end datum feature constrains longitudinal movement between the inner belt and the inner trim panel, while cooperating horizontal leg portions of both the inner belt and inner trim panel restrain the components from relative vertical movement.

7 Claims, 1 Drawing Sheet

INNER BELT ATTACHED TO DOOR INNER TRIM PANEL

BACKGROUND OF THE INVENTION

This invention is directed to a weatherstrip or weatherseal, or more particularly an inner belt and inner trim panel attachment. More specifically, it is directed to an inner belt disposed along a lower, inner edge of a vehicle door window opening and an attachment scheme with an inner door trim panel that surrounds the door window opening along an interior of the vehicle.

Typically, a flange extends from the vehicle body in a generally upward fashion along the lower edge of the door window opening. It is known to employ an inner belt weatherstrip that has a first portion that is configured and dimensioned to grippingly engage the flange. One or more seal lips extend outwardly from the weatherstrip toward the exterior of the vehicle so as to operatively engage an interior surface of the window as the window is selectively raised and lowered relative to the door. The seal lips usually have a low friction coating such as a flock or other low friction surface that allows the window to be easily raised and lowered without the seal lips imposing undue frictional forces on the window.

The weatherstrip is configured for attachment to the vehicle flange, commonly employing an inverted U-shaped body formed from generally parallel first and second legs interconnected at an upper end by a wall having a transverse dimension that forms a cavity that accommodates the width of the vehicle flange. Moreover, one or more gripping members or gripping fingers extend from at least one of the legs inwardly into the cavity to grippingly engage the vehicle flange and prevent inadvertent removal of the weatherstrip from the flange once the weatherstrip is inserted in location. For ease of manufacture, the inner belt weatherstrip has a cross-sectional configuration that is easily extruded and limits the amount of post extrusion manufacturing steps and allows for ease of installation onto the vehicle flange. As will be appreciated, there is a need to provide a simple, effective weatherstrip that can be easily installed on a vehicle flange in a repeatable, accurate manner that does not add undue cost of manufacture or additional cost associated with assembling the weatherstrip to the vehicle.

Separate and apart from the inner belt weatherstrip, vehicle manufacturers employ a trim panel that closes out or surrounds the inner perimeter of the vehicle door opening. Unsightly gaps between the inner belt and the interior surface of the vehicle are usually eliminated by the trim panel that surrounds the door opening and provides a transition between the functional inner belt weatherstrip and the vehicle interior. The trim panel is often a thermoplastic structure that is either molded or extruded and when attached to the vehicle provides a durable, aesthetically pleasing appearance. For example, the trim panel is typically color coordinated with the vehicle interior. The trim panel is often separately secured to the vehicle interior. Pins, clips, or other structural features are used to locate and secure the inner trim panel in proper position adjacent the vehicle door window opening. Likewise, the inner trim panel commonly abuts against the inner belt. As a result, the inner belt is normally assembled to the vehicle first and the trim panel subsequently mounted or assembled to the vehicle. This requires separate assembly steps with attendant cost associated with these separate steps. Likewise, the inner belt weatherstrip and trim panel are secured to different components of the vehicle so that they are subject to tolerance variations that can result in misalignment of the trim panel relative to the inner belt.

Current arrangements use clips, punched toy tabs, or other fasteners (referred generically in the following discussion as "clips") to secure the inner belt to the trim panel. Although the clips have been widely used commercially, potential problems are associated with this. First, the clips are typically metal, i.e., the clips are ferrous, or require a metal core, and thus introduce an undesired corrosion issue into the assembly. Second, the addition of metal to the seal adds weight to the overall assembly and there is always a desire to reduce vehicle weight. Third, the clips must be deformed, e.g., bent over, to secure the inner belt and trim panel together. This adds time and expense to the assembly operation.

There is also a need to lock the inner trim panel and the inner belt together so that there is no movement of one component relative to the other once installed on the vehicle.

Thus, there is a desire to provide an easy to manufacture, easy to assemble vehicle inner trim panel and inner belt assembly that overcomes these problems and others without adding undue cost or complication to the vehicle, while still meeting the functional and aesthetic needs of the vehicle manufacturer.

SUMMARY OF THE INVENTION

An inner belt is received on an associated vehicle flange along an associated door opening. The inner belt includes a generally U-shaped gripping portion formed by first and second legs dimensioned for receipt on opposite faces of the associated flange. Rigid, spaced hooks extend from the first leg and form an upturned cavity dimensioned to receive an associated hook portion from an associated trim panel received about an associated interior portion of the associated door opening.

The hook portions slide relative to one another until the hook portions of one component pass through similarly sized gaps or openings in the other component, and then the hook portions overlap or become interlocked to prevent inadvertent removal once the components are joined together.

A locking datum feature is provided on one of the components to limit the longitudinal movement of the inner belt relative to the trim panel.

This attachment reduces weight of the combined inner belt and trim panel.

By eliminating the use of clips, the attendant problem of corrosion is eliminated.

The system described herein also advantageously locks the individual inner belt and inner trim panel components in the fore and aft direction when assembled.

Still other features and advantages of the invention will become apparent from reading and understanding the following detailed description.

DETAILED DESCRIPTION OF THE INVENTION

Figure 1:
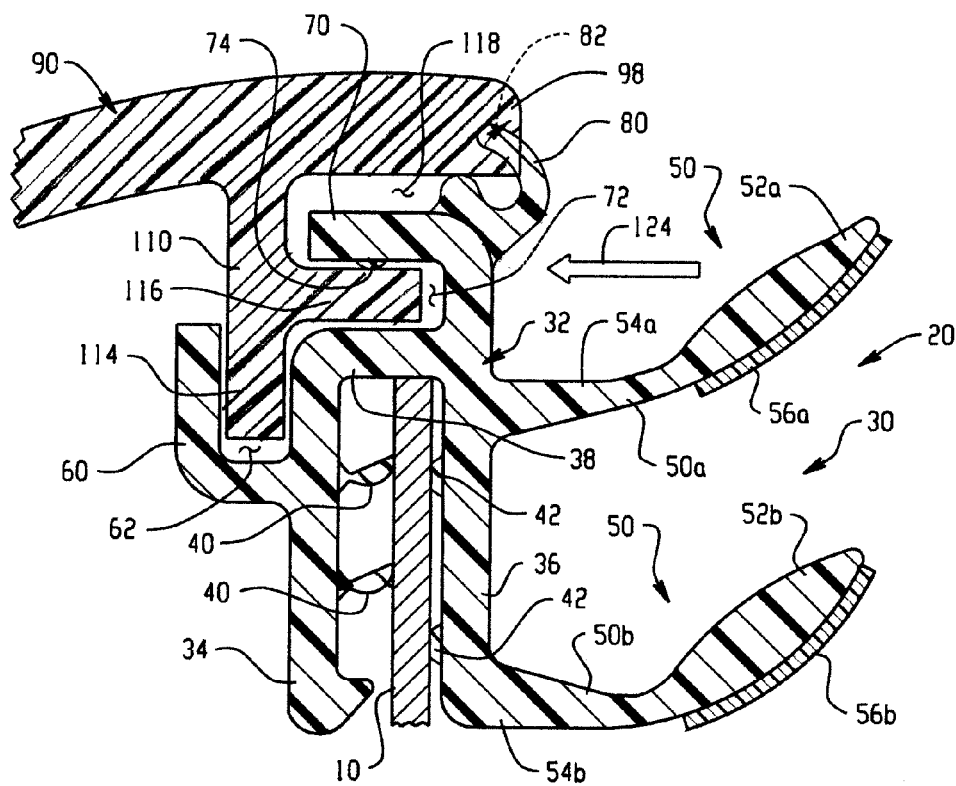
FIG. 1 is a cross-sectional view taken through the longitudinal extent of the inner belt attachment to the inner trim panel in accordance with the present invention.

Turning to the Figures, a vehicle flange 10 extends along a base of a door opening and is shown extending in a generally vertical fashion in FIG. 1 as is common in the industry. The flange is a primary attachment point for the weatherstrip along an inner belt region of vehicle door opening, usually comprising a single strip of metal from a door inner panel. The flange defines the lower inner edge of the window opening in the door so that it will be appreciated that the window is located rightwardly of the structure shown in FIG. 1. The vehicle window (not shown) is selectively raised and lowered relative to the flange by manual or power driven means or components (also not shown) as is well known in the art so that further discussion herein is unnecessary to a full and complete understanding of the present invention.

An inner belt and inner trim panel assembly 20 includes a weatherstrip, particularly an inner belt 30 having a body 32 that includes first and second legs 34, 36 that are dimensioned for receipt on opposite faces of vehicle flange 10. The first and second legs 34, 36 are generally parallel and spaced by a predetermined dimension via connecting wall 38 that interconnects one end of the first and second legs to define a generally U-shaped gripping portion of the body. From-at least one of the legs are provided means for gripping, which in the preferred embodiment are defined by individual gripping fingers 40, that extends inwardly into an internal cavity defined by the first and second legs and connecting wall 38 for engagement with the vehicle flange (although it will be recognized that this gripping feature is not used on all designs of inner belts). The gripping fingers are intended to prevent inadvertent removal of the inner belt from the vehicle flange once it is inserted over the vehicle flange in a downward manner, i.e., the vehicle flange is received by advancing the inner belt over the flange until an upper edge of the flange engages or abuts the connecting wall 38. Again, the flange and gripping feature are not required on some designs of inner belts. Anti-rattle means such as strips, bumps, or protuberances 42 are shown extending inwardly from the second leg 36. These anti-rattle bumps 42 may be provided at spaced locations along the inner belt so that, for example, when a door is closed on a vehicle, the bumps 42 absorb some of the impact when the door engages the vehicle frame. These bumps deaden the sound or absorb the vibration and thereby provide an anti-rattle feature. It will be appreciated that the anti-rattle members are an optional feature, and could adopt another configuration than the illustrated bumps.

Extending outwardly from one of the legs, shown here as the second leg 36, is a least one seal lip 50. This embodiment illustrates a pair of seal lips 50a, 50b, that are preferably integrally formed with the body. Portions 52a, 52b of the seal lips may be formed in one preferred arrangement such as through a co-extrusion process of a slightly more flexible material than the interconnecting portions 54a, 54b that merge into the second leg 36, although this feature is optional. A low-friction layer 56a, 56b may also be provided on the respective seal lips. Preferably, the low-friction layer is a flock or low-friction plastic adapted to sealingly, yet slidably, engage the vehicle window (not shown) as the window is raised and lowered relative to the vehicle opening.

A series of rigid, longitudinally spaced hooks 60, one of which is shown in cross-section in FIG. 1, extend from first leg 34. The hooks 60 define an upturned cavity 62 that receive trim panel hooks as will be described in greater detail below. The hooks are longitudinally spaced by gaps or openings for reasons which will become more apparent below. In addition, a horizontally extending leg 70 extends outwardly from the body, and is shown here as extending generally parallel to the connecting wall 38 to define horizontally opening cavity 72. The leg 70 also preferably includes an anti-rattle bump, strip, or protuberance 74 that cooperates with a horizontal leg portion of the inner trim panel as will be described further below. Again, the anti-rattle bump is not required in all inner belt designs.

A flexible closeout lip 80 is shown in FIG. 1. The reference arrow 82 represents that the closeout lip will deflect in the direction shown once the trim panel and inner belt are connected together. Again, like the legs 34, 36, 38, 60, and 70, the closeout lip 80, seal lips 50, and retaining fingers 40 may all be integrally formed in a single process to reduce manufacturing costs. Thus, each of these features preferably has a cross-sectional shape that is conducive to a co-extrusion process, although this invention should not be limited to this method of manufacture or particular cross-sectional configuration, i.e. this lip feature is not used in all inner belt designs.

Figure 2:
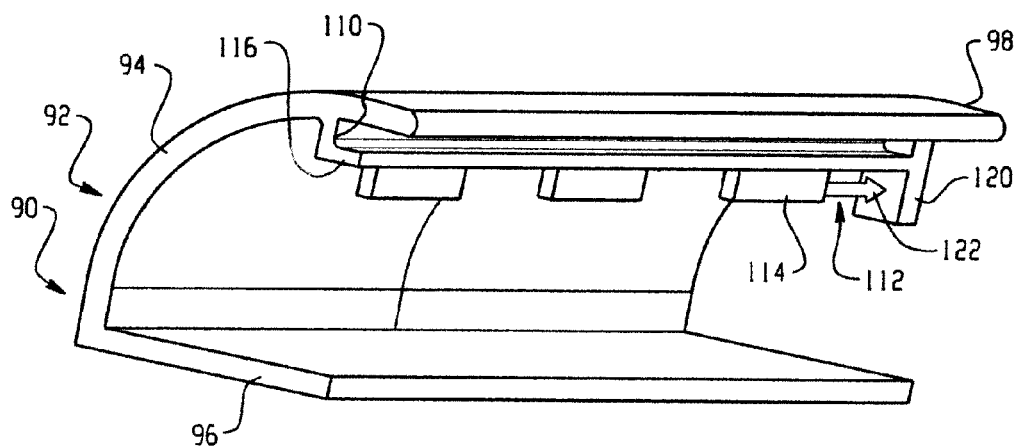
FIG. 2 is a perspective view of the inner trim panel particularly illustrating a portion of the attachment feature of the present invention.

With continued reference to FIG. 1, and additional detailed reference in FIG. 2, an inner trim panel 90 will be described in greater detail. The inner trim panel is preferably formed of a rigid material. The body 92 includes a curved portion 94, base wall 96 and horizontal legs 98, 116. Base wall 96 however was included in one design iteration and is not necessarily required in other embodiments. As will be understood by one skilled in the art, the curvilinear wall portion 94 provides an aesthetically pleasing contour that merges with the interior of the vehicle. Terminal edge of horizonal leg 98 engages and deflects closeout lip 80 when the inner belt and inner trim panel are assembled together, although it will be appreciated that this lip feature is optional. Extending downwardly from an inner surface of the curvilinear wall 94 is a first or vertical leg 110 that is selectively notched to form voids, gaps or openings 112 longitudinally spaced by trim panel hooks 114 that extend in rigid fashion as a continuation of the leg 110. In addition, horizontal leg portion 116 extends at a generally right angle from the leg 110 to form a cavity 118 (FIG. 1), with the terminal end portion 98 of the curvilinear wall that receives the horizontal leg 70 of the inner belt. As best illustrated in FIG. 2, horizontal leg 116 extends along the entire longitudinal extent of the inner trim panel and as a result of the cooperation with horizontal leg 70 of the inner belt prevents relative vertical movement between components once they are assembled.

An end datum feature 120 extends downwardly from the curvilinear wall at one end of the inner trim panel. The end datum feature is a locking feature that precludes relative longitudinal sliding movement in a fore and aft direction as represented by arrow 122 once the inner belt and inner trim panel are fully secured together.

To assemble, and since the inner belt hooks and the inner trim hooks are both rigid, the inner belt hooks slide in a horizontal direction through the voids between the trim panel hooks as represented by reference arrow 124 in FIG. 1. Then, the respective hooks slide past one another in a longitudinal direction, i.e., along reference arrow 122 in FIG. 2, until the inner belt engages the end datum feature 120. Once located in this manner, the hooks are disposed in vertically adjacent, abutting engagement, particularly as shown in FIG. 1. Thus, it will be appreciated that the inner trim panel and the inner belt are constrained against vertical movement by the overlapping legs 116, 98 that receive the horizontal legs 70 of the inner belt within cavity 118. Transverse movement is constrained by abutting engagement between inner belt hooks 60 and the inner trim panel hooks 114. Lastly, longitudinal movement is constrained by abutment of the inner belt wall 38 with the locking datum feature 120.

It will also be appreciated that the inner trim panel may be assembled to the inner belt prior to installation on the vehicle flange. Alternatively, the inner belt can be installed on the vehicle flange, and then the inner trim panel subsequently installed or joined to the inner belt as described above, although it will be appreciated that this arrangement would be difficult to load.

The components may be extruded or coextruded, and subsequent manufacturing steps form the gaps or openings between the hooks.

The invention has been described with reference to the preferred embodiments. Obviously, modifications and alterations will occur to others upon a reading and understanding of this specification. The invention is intended to include all such modifications and alterations insofar as they come within the scope of the appended claims or the equivalents thereof.

The invention claimed is:

1. A combination of an inner belt and a weatherstrip inner trim panel assembly for mounting to an associated flange of an associated vehicle door opening, the combination comprising:

an elongated inner belt body having a mounting groove extending in a longitudinal direction of the belt body and dimensioned for receipt over the associated flange, at least one seal lip extending from the inner belt body, a first leg extending from the inner belt body and having a portion thereof extending in a substantially horizontal direction and a plurality of receiving hooks extending from the inner belt body and each having a portion thereof extending generally vertically upwardly toward the first leg, the receiving hooks spaced from one another in the longitudinal direction by recesses and form a plurality of cavities between the receiving hooks and the inner belt body; and the inner trim panel assembly including an elongated inner trim panel body having a substantially horizontal leg that is received between the inner belt body and the first leg to join the inner trim panel body to the inner belt body, and a series of projecting hooks extending generally downwardly from the inner trim panel body and being longitudinally spaced apart from one another to form generally downwardly opening recesses for selective lateral receipt through the recesses of the receiving hooks, the projecting hooks being longitudinally offset from the receiving hooks in an unlocked position, and disposed in the plurality of cavities and laterally interfering with the receiving hooks in a locked position.

2. The combination of claim 1 further comprising a datum feature on one of the inner belt body and the inner trim panel body that lockingly engages one of the hooks on the other of the inner belt body and the inner trim panel body to limit relative sliding movement therebetween.

3. The combination of claim 2 wherein the datum feature is located at a preselected position such that upon engagement with the one hook, the projecting hooks of the inner belt body and the hooks of the inner trim panel body are in the locked position.

4. The combination of claim 1 wherein the hooks substantially prevent lateral movement perpendicular to the longitudinal direction between the inner belt body and the inner trim panel body when the projecting hooks are in the locked position.

5. The combination of claim 1 wherein the legs are continuous along their longitudinal extent.

6. The combination of claim 1 further comprising fingers extending into the mounting groove adapted for retaining engagement with the associated flange.

7. The combination of claim 1 further comprising an anti-rattle bump on the inner belt body.

* * * * *